United States Patent
Furukawa

(10) Patent No.: US 10,350,706 B2
(45) Date of Patent: Jul. 16, 2019

(54) LASER PROCESSING SYSTEM AND RECORDING MEDIUM STORING COMPUTER READABLE PROGRAMS FOR CONTROLLING THE SAME

(71) Applicant: BROTHER KOGYO KABUSHIKI KAISHA, Nagoya-shi, Aichi-ken (JP)

(72) Inventor: Koki Furukawa, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 295 days.

(21) Appl. No.: 15/473,171

(22) Filed: Mar. 29, 2017

(65) Prior Publication Data

US 2017/0203389 A1 Jul. 20, 2017

Related U.S. Application Data

(63) Continuation of application No. PCT/JP2015/077276, filed on Sep. 28, 2015.

(30) Foreign Application Priority Data

Sep. 30, 2014 (JP) .................................. 2014-202132

(51) Int. Cl.
*B23K 26/03* (2006.01)
*B23K 26/082* (2014.01)
(Continued)

(52) U.S. Cl.
CPC ........ *B23K 26/082* (2015.10); *B23K 26/0006* (2013.01); *B23K 26/03* (2013.01);
(Continued)

(58) Field of Classification Search
CPC ..... B23K 26/082; B23K 26/03; B23K 26/364
See application file for complete search history.

(56) References Cited

U.S. PATENT DOCUMENTS 4,949,281 A * 8/1990 Hillenbrand ............ B41B 19/02
345/442
6,140,602 A * 10/2000 Costin ................... B23K 26/067
219/121.69
(Continued)

FOREIGN PATENT DOCUMENTS

JP H07-32168 A 2/1995
JP H09-285882 A 11/1997
(Continued)

OTHER PUBLICATIONS

International Preliminary Report on Patentability Chapter I dated Apr. 13, 2017 issued in the corresponding international patent application No. PCT/JP2015/077276.
(Continued)

*Primary Examiner* — Vincent H Tran
(74) *Attorney, Agent, or Firm* — K&L Gates LLP

(57) ABSTRACT

To form a print design on a workpiece with a laser beam, the print design is divided into one or more straight line segments. For each of the straight line segment, coordinate data representing coordinate points is generated. The laser beam is scanned from a start point of the straight line segment toward an end point thereof via the coordinate points while irradiating the laser beam onto the start point, coordinate points, and the end point. The first part of the straight line segment following the start point and the second part ahead of the end point of the straight line segment are scanned at a speed lower than a designated top speed. An intermediate part between the first and the second parts is scanned at the designated top speed, whereby the peak level of the transient current flowing in the scanning section can be lowered.

7 Claims, 12 Drawing Sheets

(51) Int. Cl.

| | | |
|---|---|---|
| *B41M 5/24* | (2006.01) | |
| *B23K 26/00* | (2014.01) | |
| *B23K 26/12* | (2014.01) | |
| *B23K 26/362* | (2014.01) | |
| *B23K 26/0622* | (2014.01) | |
| *B23K 26/352* | (2014.01) | |
| *B41M 5/26* | (2006.01) | |

(52) U.S. Cl.
CPC ........ *B23K 26/0622* (2015.10); *B23K 26/127* (2013.01); *B23K 26/352* (2015.10); *B23K 26/355* (2018.08); *B23K 26/362* (2013.01); *B41M 5/24* (2013.01); *B41M 5/26* (2013.01)

(56) References Cited

U.S. PATENT DOCUMENTS

| | | | |
|---|---|---|---|
| 6,160,568 A | | 12/2000 | Brodsky et al. |
| 2008/0067251 A1* | 3/2008 | Yoshimoto | ............... B41J 2/471 235/462.32 |
| 2009/0078687 A1* | 3/2009 | Idaka | ................... B23K 26/032 219/121.69 |
| 2009/0154504 A1* | 6/2009 | Sato | ......................... B41J 2/471 372/10 |
| 2010/0039916 A1* | 2/2010 | Hasegawa | ............ G06K 15/029 369/100 |
| 2013/0335501 A1* | 12/2013 | Furukawa | ............. B41J 2/4753 347/211 |
| 2014/0025336 A1* | 1/2014 | Noda | .................. G01B 21/042 702/168 |
| 2014/0230706 A1* | 8/2014 | Suzuki | ................... D05B 19/12 112/102.5 |
| 2015/0049154 A1* | 2/2015 | Oda | ....................... B41J 2/4753 347/250 |
| 2015/0080214 A1* | 3/2015 | Yamamoto | ............. B41J 2/4753 503/201 |
| 2015/0151550 A1* | 6/2015 | Asai | ....................... B41M 5/305 347/225 |

FOREIGN PATENT DOCUMENTS

| | | |
|---|---|---|
| JP | 2000-114619 A | 4/2000 |
| JP | 2001-300747 A | 10/2001 |
| JP | 2001-321970 A | 11/2001 |
| JP | 2004-216392 A | 8/2004 |
| JP | 2008-003756 A | 1/2008 |
| JP | 2009-050916 A | 3/2009 |

OTHER PUBLICATIONS

English translation of the Written Opinion of the International Search Authority issued in the corresponding international patent application No. PCT/JP2015/077276 dated Dec. 22, 2015.

International Search Report issued in the corresponding international patent application No. PCT/JP2015/077276 dated Dec. 22, 2015.

Written Opinion of the International Search Authority issued in the corresponding international patent application No. PCT/JP2015/077276 dated Dec. 22, 2015.

* cited by examiner

LASER PROCESSING SYSTEM AND RECORDING MEDIUM STORING COMPUTER READABLE PROGRAMS FOR CONTROLLING THE SAME

CROSS REFERENCE TO RELATED APPLICATIONS

This application is a continuation application of International Patent Application No. PCT/JP2015/077276 filed Sep. 28, 2015 in the Japan Patent Office acting as a Receiving Office. International Patent Application No. PCT/JP2015/077276 claims priority from Japanese Patent Application No. 2014-202132 filed Sep. 30, 2014. The entire contents of the priority application and the International application are incorporated herein by reference.

TECHNICAL FIELD

The following disclosure relates to a recording medium storing computer readable programs for generating a plurality of pieces of coordinate data representing coordinate points including start points and end points of line segments that make up of a diagram to be formed by laser processing, and also to a laser processing system.

BACKGROUND

Japanese Patent Application Publication No. 2001-321970 discloses a laser marking device in which generated is a plurality of pieces of coordinate data representing coordinate points including start points and end points of line segments that make up of print design to be formed by laser processing. A laser is successively irradiated onto a series of coordinate points on a point-to-point basis starting from the start point and ending at the end point of the straight line segment. Each of a plurality of straight line segments is laser scanned in such a way, so that the print design, such as a character string, is formed on a workpiece.

With the laser marking device disclosed in Japanese Patent Application Publication No. 2001-321970, two adjacent coordinate points are generated to be apart a long distance one from the other and the line between the that the print quality is not degraded, a total amount of coordinate data is decreased, and a high speed printing can be achieved without being affected by a data transfer limitation.

On the other hand, it is unlikely that the tracking delay of the Galvano-mirror occurs when the print speed is set low, and thus it is capable of precisely forming a print design on a workpiece. Generating coordinate data for a straight line segment with a short point-to-point distance results in high density in the number of coordinate points, thereby enabling a smoothly curving line to print. While a total amount of transfer data increases, data transfer can be accomplished because the print speed is not as high as the data transfer speed.

A set of two points is scanned at a fast speed. The longer the point-to-point distance is in the straight line segment, the faster the scanning speed is set. As such, tracking delay of a Galvano-mirror occurs as the print speed gets faster. When two straight line segments are connected to be in diagonal relation, the laser beam smoothly scans along a curve line, rather than a bent line forming an angle between two straight lines.

As described, according to the laser marking device disclosed in Japanese Patent Application Publication No. 2001-321970, the higher the scanning speed of the Galvano-mirror is set to, the longer the point-to-point distance between the two adjacent coordinate points on the straight line segment is set. Hence, a high speed printing can be carried out without being affected by the data transfer limitation.

SUMMARY

When the scanning speed of the Galvano-mirror is accelerated, a transient current flows. The level of the transient current is proportional to the acceleration value, and the level of the current is generally in proportional to the power supply capability of a power supply. That is, acceleration of the scanning speed will become large when the Galvano-mirror is scanning at a high speed, causing the level of the transient current to become high. In order to suppress such a high level transient current, a power source having a high level voltage supplying capability needs to be provided.

In view of the foregoing, it is an object of the invention to provide a program that is designed to suppress a large transient current from flowing in a scanning section even if the scanning speed is set to high.

In order to achieve the above and other objects, there is provided a non-transitory computer readable storage medium storing a set of program instructions for an arithmetic unit to generate a plurality of pieces of coordinate data including coordinate data representing a start point and an end point of a straight line segment. The coordinate data generated by the arithmetic unit is used for processing a workpiece to form a predetermined print design thereon with a laser beam scanned by a scanning section of a laser processing system. The set of program instructions includes an acquiring process for acquiring a designated scanning speed of the scanning section; a dividing process for dividing the print design into one or more straight line segments; a determining process for determining whether a straight line segment selected from the one or more straight line segments has a length shorter than a predetermined length; a first coordinate data generating process for generating first coordinate data in response to determination made in the determining process that the selected straight line segment has a length not shorter than a predetermined length, the coordinate points represented by the first coordinate data belong to at least one of a first group and a second group. In other words, there are three possible cases in the distribution of the coordinate points represented by the first coordinate data; the coordinate points may exist only in the first group or the second group, or both.

One or more coordinate points belonging to the first group are arranged consecutively at an equi-pitch on the selected straight line segment from a start coordinate point of the selected straight line segment toward an end coordinate point thereof.

Each of the one or more coordinate points belonging to the first group designates an end point of a sub-line segment defined by two adjacent coordinate points and is within the selected straight line segment.

A scanning speed for the coordinate points represented by the first coordinate data and belonging to the first group is set to a first speed lower than the designated scanning speed.

The one or more coordinate points belonging to the second group are arranged consecutively at an equi-pitch on the selected straight line segment from the end coordinate point of the selected straight line segment toward the start coordinate point thereof.

Each of the one or more coordinate points belonging to the second group designates an end point of a sub-line segment defined by two adjacent coordinate points and is within the selected straight line segment.

A scanning speed for the coordinate points represented by the first coordinate data and belonging to the second group is set to a second speed lower than the designated scanning speed.

The set of program instructions further includes a second coordinate data generating process for generating second coordinate data different from the first coordinate data in response to determination made in the determining process that the selected straight line segment has a length not shorter than the predetermined length.

The second coordinate data is generated following generation of the first coordinate data, and represents one or more coordinate points set to a vacant portion of the selected straight line segment where no coordinate points represented by the first coordinate data are set.

Each of the one or more coordinate points designates an end point of a sub-line segment defined by two adjacent coordinate points of the one or more coordinate points represented by the second coordinate data and is within the selected straight line segment.

The one or more coordinate points represented by the second coordinate data are scanned at the designated scanning speed.

Laser scan is performed from the start point toward the end point of the selected straight line segment via coordinate points represented by the first coordinate data and the second coordinate data while making a laser irradiation onto the start point, the coordinate points, and the end point.

As such, each of straight line segments divided from a print design to be formed on a workpiece is scanned by the scanning section at a first speed lower than the designated scanning speed in a first part close to the start point of the straight line segment, at a second speed lower than the designated scanning speed in a second part close to the end point of the straight line segment, and the designated scanning speed in a third, intermediate part between the first part and the second part. The laser scanning is performed from the start point toward the end point and a spot laser irradiation is performed onto the coordinate point. Hence, the laser scanning is not performed at a constant speed over the entire length of the straight line segment but performed in such a manner that the scanning speed is accelerated when the scanning portion changes from the first part to the second part and is decelerated when the scanning portion changes from the second part to the third part. That is, the scanning speed is not abruptly changed from zero to the designated scanning speed set in advance but instantaneously changed from zero to the first scanning speed slower than the designated scanning speed and then the scanning speed is accelerated to arrive at the designated scanning speed. Conversely, the designated scanning speed is not abruptly changed to zero but instantaneously changed from the designated scanning speed to the second scanning speed lower than the designated scanning speed and then the second scanning speed is decelerated to be zero.

Accordingly, even if the set (maximum) scanning speed is high, the acceleration of the scanning section does not become high due to the gradual stepwise increase of the scanning speed, resulting in lowering the peak level of the current flowing in the scanning section caused by a transient response.

BRIEF DESCRIPTION OF THE DRAWINGS

The particular features and advantages of the invention as well as other objects will become apparent from the following description taken in connection with the accompanying drawings, in which.

DETAILED DESCRIPTION

<Structure of Laser Processing System>

Figure 1:
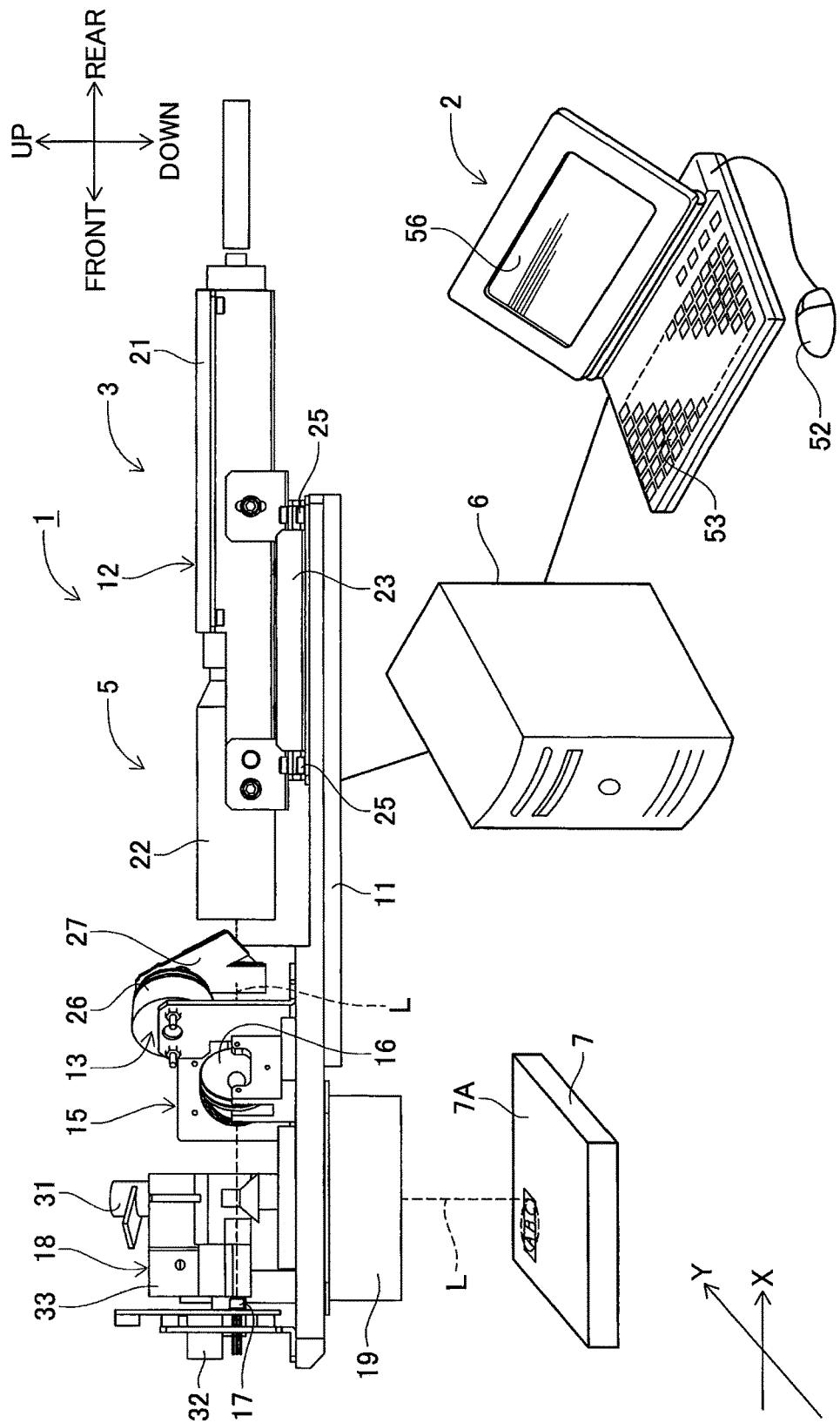
FIG. 1 is an outline arrangement of laser processing system 1 in accordance with one embodiment.
Figure 2:
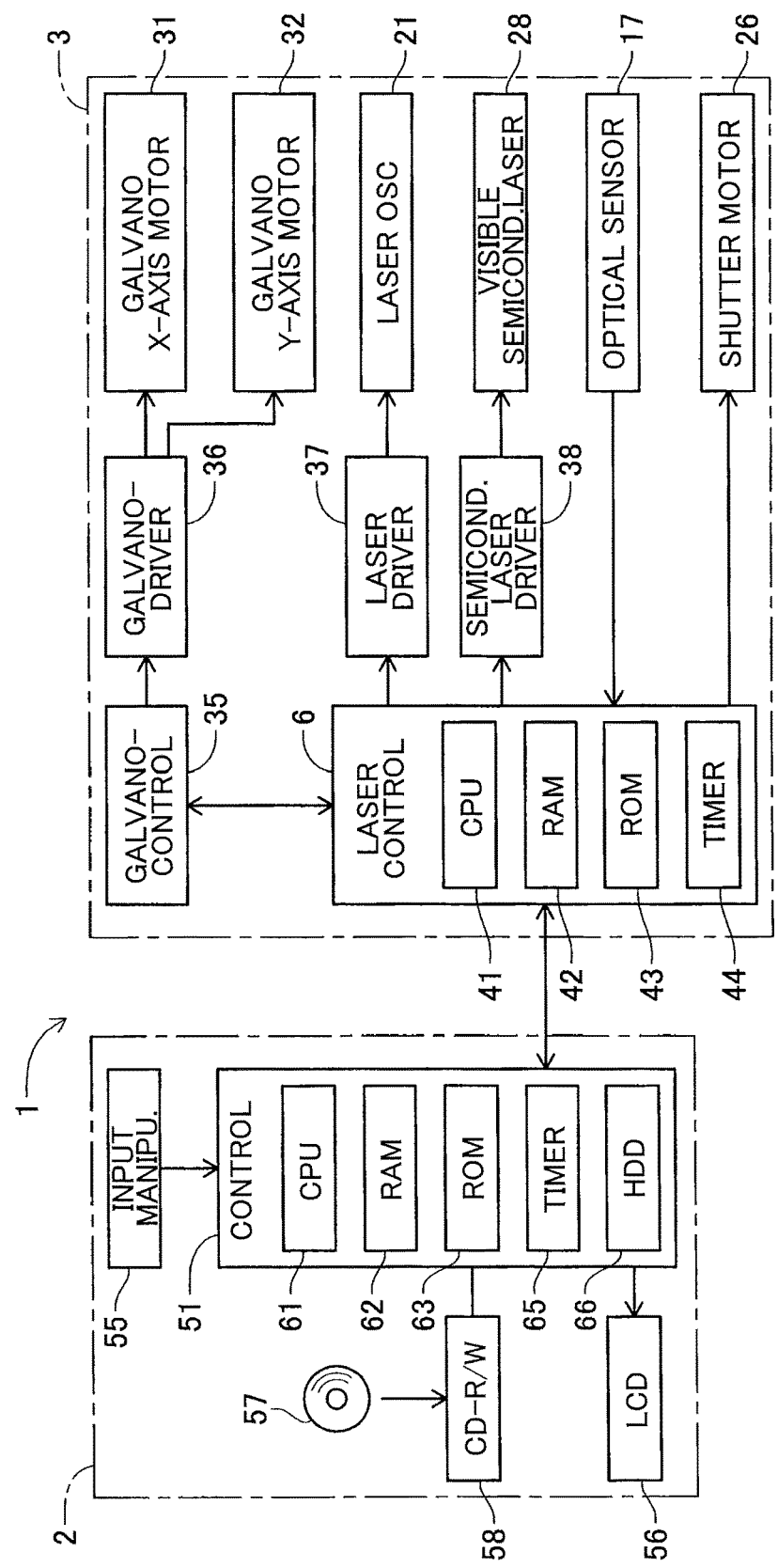
FIG. 2 is a block diagram showing electrical arrangement of print data generating device 2 and laser processing section 3.

As shown in FIGS. 1 and 2, a laser processing system 1 in accordance with one embodiment includes print data generating device 2 and laser processing section 3. A personal computer (PC) is used for the print data generating device 2. The print data generating device 2 includes a controller 51, an input manipulation section 55, a liquid crystal display (LCD) 56, and a CD-R/W 58. The controller 51 is provided for governing overall operations of the print data generating device 2. The input manipulation section 55 includes a mouse 52 and a keyboard 53. The CD-R/W 58 is provided for reading from and writing into CD-ROMs 57 various types of data and/or programs. Diagrams, figures, characters, alphabetical numerals/letters, symbols, and the like (hereinafter referred to as "print design") subject to laser scan or laser printing with a laser beam are input into the print data generating device 2 using the input manipulation section 55. The print design inputted by the input manipulation section 55 is displayed on the LCD 56. The input manipulation section 55 is also capable of moving the print design on the LCD 56 relative to the workpiece 7. In accordance with the input from the input manipulation section 55, an image of the input data is generated by the print data generating device 2 and print data of the image is also generated by the print data generating device 2. The print data indicates positional information about each of points constituting the image of the print pattern. As shown in FIG. 2, connected to the controller 51 are the input manipulation section 55, the LCD 56, and the CD-R/W 58 via an I/O interface (not shown). The CD-R/W 58 is used to read from and write into the CD-ROM 57 various application softwares, such as programs shown in the form of flowcharts in FIGS. 3 to 9.

A side view of the laser processing section 3 is shown in FIG. 1 and a block diagram showing an electrical arrangement of the laser processing section 3 is shown in FIG. 2. The laser processing section 3 includes a laser processing main section 5 and a laser controller 6. The laser processing main section 5 irradiates laser beam LA onto the machining surface 7A of the workpiece 7 and performs two-dimensional scan of laser beam LA on the machining surface 7A of the workpiece 7. In this way, a laser scan process is performed for the workpiece 7.

A computer is used for the laser controller 6. The laser controller 6 is connected to the print data generating device 2 so as to be capable of performing bi-directional communications therebetween. The laser controller 6 is also electrically connected to the laser processing main section 5. The laser controller 6 drives and controls the laser processing main section 5 in response to print data, control parameters, and various instructions transmitted from the print data generating device 2. In other words, the laser controller 6 governs the laser processing section 3 in its entirety.

Next, the structure of the laser processing main section 5 will be outlined while referring to FIG. 1. In the following description, the leftward, rightward, upward and downward in FIG. 1 correspond to frontward, rearward, upward, and downward of the laser processing main section 5, respectively, as indicated in FIG. 1. Also, in the direction perpendicular to both the upward/downward directions and frontward/rearward directions, the far side is the left side and near side is the right side of the laser processing main section 5 as viewed from the front side.

As shown in FIG. 1, the laser processing main section 5 includes a main base 11, laser oscillation unit 12 configured to emit a laser beam LA, a light shutter 13, a light damper (not shown), a half-mirror (not shown), a guide optical section 15, a reflection mirror 16, an optical sensor 17, a Galvano-scanner 18, and an fθ lens 19. The laser processing main section 5 is housed in a housing (not shown) that is generally of a parallelepiped shape.

The laser oscillation unit 12 includes a laser oscillator 21, a beam expander 22, and a mounting base 23. The laser oscillator 21 is configured from $CO_2$ laser, YAG laser or the like. With the laser beam LA irradiated from the laser oscillator 21, laser scan (or laser marking) is performed on the machining surface 7A of the workpiece 7. The beam expander 22 and laser oscillator 21 are disposed in alignment with each other or arranged side-by-side on the same axis. The beam expander 22 is provided for adjusting, i.e., increasing or decreasing the diameter of the laser beam LA. The laser oscillator 21 is mounted on the mounting base 23 to allow the laser oscillator 21 to adjust the orientation of an optical axis of the laser beam LA. The mounting base 23 is fixedly secured with screws 25 to the upper surface and a rear position of the main base 11.

The light shutter 13 includes a shutter motor 26 and a plate-shaped shutter 27. A stepping motor is used for the shutter motor 26. The shutter 27 is attached in coaxial relation to the shaft of the shutter motor 26 so as to rotate together with the motor shaft. When the shutter 27 is rotationally brought to a position where the laser beam LA emitted from the beam expander 22 is interrupted, the laser beam LA is reflected on the shutter 27 and directed toward the optical damper disposed rightwardly of the light shutter 13. On the other hand, when the shutter 27 is rotationally brought to a position out of the light path of the laser beam LA, the laser beam LA emitted from the beam expander 22 is directed toward the half-mirror (not shown) disposed in the front side of the optical shutter 13.

The optical damper (not shown) absorbs the laser beam LA entering thereinto upon reflecting on the shutter 27. A cooling device (not shown) is provided for cooling the optical damper. The half-mirror (not shown) is disposed so that the mirror surface is oriented in diagonally left-lower direction to form 45 degrees with respect to the optical path of the laser beam LA. The half-mirror allows substantially all the laser beam LA incident into the rear side of the half-mirror to pass therethrough. A part of the laser beam LA incident into the rear side of the half-mirror, for example, 1% of the laser beam LA, is reflected at 45 degrees so as to be directed toward the reflection mirror 16. The reflection mirror 16 is disposed at a leftside position relative to the center line on the rear surface of the half-mirror upon which the laser beam LA is incident.

The guide optical section 7 includes a visible semiconductor laser 18 (see FIG. 2) and a lens array (not shown) for collimating the visible laser beam emitted from the visible semiconductor laser 28 into a parallel beam. The visible semiconductor laser 28 irradiates a visible interference light, or visible laser beam, such as red-color laser beam. The visible laser beam has a wavelength different from that of the laser beam LA irradiated from the laser oscillator 21. The guide optical section 15 is disposed at a position right side of the center of the half-mirror from which the laser beam LA is emitted. As a result, the visible laser beam is incident upon the center portion of the front or reflection surface of the half-mirror with an incident angle of 45 degrees with respect to the reflection surface of the half-mirror. Then, the visible laser beam is reflected upon the reflection surface of the half-mirror with a reflection angle of 45 degrees and advances along the optical path of the laser beam LA.

The half-mirror has a wavelength-dependent reflectivity. The half-mirror is of a multi-layered structure of a dielectric layer and a metal layer to which a surface treatment is carried out. As such, the half-mirror exhibits high reflectivity with respect to the visible laser beam. However, the half-mirror allows 99% of the laser beam LA to pass therethrough.

The reflection mirror 16 is disposed in the light path of the laser beam LA in an orientation to face diagonally leftward/downward to form 45 degrees relative to the light path. A part of the laser beam LA reflected upon the rear surface of the half-mirror is incident upon the central portion of the reflection surface of the reflection mirror 16 at an incident angle of 45 degrees. The reflection mirror 16 directs the laser beam LA in the frontward direction at a reflection angle of 45 degrees.

The optical sensor 17 is configured from a photo-detector capable of detecting light intensity of the laser beam LA. As shown in FIG. 1, the optical sensor 17 is disposed in front of the reflection mirror 16 so as to receive the laser beam LA emitted from the central portion of the reflection mirror 16 upon which the laser beam LA is reflected. With such a positional relationship between the reflection mirror 16 and the optical sensor 17, the light intensity of the laser beam LA can be detected. In this manner, the light intensity of the laser beam LA emitted from the laser oscillator 21 can be detected with the optical sensor 17.

An opening is formed in a front portion of the main base 11. The Galvano-scanner 18 is disposed above the opening of the main base 11 and directs the laser beam LA and the visible laser beam downward through the opening and performs two-dimensional scan. More specifically, the Galvano-scanner 18 includes a Galvano X-axis motor 31 and a Galvano Y-axis motor 31 which are mounted on the main unit 33. To perform the two-dimensional scan of the laser beam LA and the visible laser beam, the shafts of the two motors are inserted into the respective openings formed in the main unit 33. The motor shafts of the two motors 31 and 32 are arranged orthogonal to each other and a scan mirror is movably attached to the tip end of each motor shaft. The two scan mirrors diagonally face each other and perform two-dimensional scans while moving in cooperation with each other. Controlling the rotations of the motors 31 and 32 changes the reflecting angles of the respective scan mirrors. Thus, the laser beam LA and the visible laser beam are directed downward and perform two-dimensional scans for scanning the laser beams frontward/rearward (X direction) and leftward/rightward (Y direction).

The fθ lens 19 operates to collimate the two-dimensionally scanning laser beams onto the machining surface 7A of the workpiece 7 disposed below the main unit 33. In this manner, by controlling the rotations of the motors 31 and 32, the laser beam LA and the visible laser beam perform two-dimensional scan in both frontward/rearward (X direction) and leftward/rightward direction (Y direction) on the machining surface 7A of the workpiece 7, thereby forming a desired print pattern on the workpiece 7.

An electrical arrangement of the laser machining system 1 according to one embodiment will be described with reference to FIG. 2. The laser machining system 1 includes the print data generating device 2 and the laser processing section 3. Circuit arrangements of the print data generating device 2 and laser processing section 3 are shown in FIG. 2 in block form.

As shown in FIG. 2, the laser processing section 3 includes a laser controller 6 for governing overall operations of the laser processing section 3, Galvano-controller 35, Galvano-driver 36, and laser processing section 37. Connected to the laser controller 6 are the Galvano-controller 35, Galvano-driver 36, laser driver 37, semiconductor laser driver 38, optical sensor 17 and shutter motor 26. Also, the print data generating device 2 is connected to the laser controller 6 and bi-directional communications can be made between the two. The laser controller 6 is configured to receive print data, control parameters of the laser processing main section 5, and various user instructions from the print data generating device 2.

The laser controller 6 includes CPU 41, RAM 42, ROM 43, and a timer 44 which are mutually connected to one another by buses (not shown) so as to be capable of transferring data from one to the other and receiving data at one from the other. The CPU 41 functions as an arithmetic/control device and implements overall control of the laser processing section 3.

The RAM 2 temporality stores the results of arithmetic operations performed by the CPU 41, X- and Y-coordinate data of a print pattern, and the like. The ROM 43 stores various kinds of programs including a program for performing arithmetic operations to generate a print pattern to be printed on the workpiece 7 with the laser beam LA. The print pattern is generated in association with a print time at which the print pattern is printed on the workpiece 7. Specifically, print data transmitted from the print data generating device 2 represents images defined by positional information. A set of consecutive points derived from the positional information are treated as either a single straight line or an elliptic segment cured line, and X- and Y-coordinate data for each of such lines is obtained to define a print pattern. The ROM 43 stores data regarding start point, end point, focal point, and curvature of each elliptic segment curved line that constitute a character with one of a plurality of fonts. Such data is stored in the ROM 43 on a font basis.

More specifically, a print pattern includes at least a start point and n end point for each of the straight line segment and an elliptic segment cured line. Each line is defined by X- and Y-coordinate data indicating the start point where the laser scanning starts and the end point where the laser scanning ends. A set of X- and Y-coordinate data is awarded with a machining order. The print pattern is computed by various programs utilizing such data stored in the ROM 3. Further, the ROM 43 stores a control program that stores various control parameters in the RAM 42. The control parameters include thickness, depth, print line number indicating how many number of times the laser scan is needed for widening and/or increasing engraving depth of the print pattern. The laser scan may be performed repeatedly while moving the laser irradiation position vertically downward in order to widen the thickness of the line. Or, the laser irradiation may be performed repeatedly on the same line to deepen the line. The control parameters further include parameters relating to a laser output from the laser oscillator 21, laser pulse width of the laser beam LA, and Galvano-scan speed representing the speed of the laser beam scan carried out by the Galvano-scanner 18. The print time of the print pattern is time data representing duration of time required for each straight line segment or each elliptic segment curved line to be printed. Such duration of time is calculated based on the Galvano-scan speed data.

The CPU 41 executes various arithmetic and control processes in accordance with the programs stored in the ROM 43. For example, the CPU 41 receives print data from print data generating device 2 and computes X- and Y-coordinate data and print time. Then, the CPU 41 outputs the resultant data to the Galvano-controller 35 together with Galvano-scan speed data. Further, the CPU 41 outputs laser drive data to the laser driver 37. The laser drive data includes laser output of the laser oscillator 21 and the laser pulse width of the laser beam LA which are set in accordance with the print data inputted from the print data generating device 2. Also, the CPU 41 outputs a laser output control signal of the laser oscillator 21 based on the light intensity of the laser beam LA inputted from the optical sensor 17.

The CPU 41 outputs an ON signal for instructing the semiconductor laser driver 38 to start lighting the visible semiconductor laser 28 and an OFF signal for instructing the semiconductor laser driver 38 to light out the visible semiconductor laser. Further, the CPU 41 selectively outputs a light shield instructing signal and an open instructing signal to the shutter motor 26. The light shield instructing signal causes the shutter motor 26 to rotate the shutter 27 to a position where the shutter 27 interrupts the optical path of the laser beam LA. The open instructing signal causes the shutter motor 26 to rotate the shutter in a position where the optical path of the laser beam LA is not interrupted.

The Galvano-controller 35 computes driving angles and rotational speeds of both the laser processing section 31 and laser processing section 32 based on the X- and Y-coordinate data of the input pattern and the Galvano-scan speed data inputted from the laser controller 6. Motor drive data representing the computed driving angle and the rotational speed is outputted to the Galvano-driver 36. In response to the motor drive data, the Galvano-driver 36 drives the laser processing section 31 and laser processing section 32 for a relevant driving angle at a relevant rotational speed, thereby performing two-dimensional scan of the laser beam LA and the visible laser.

The laser processing section 37 drives the laser oscillator 21 based on the laser drive information and the laser output control signal of the laser oscillator 21. The laser drive information includes the laser output of the laser oscillator 21 and the laser pulse width of the laser beam LA both inputted from the laser controller 6. The semiconductor laser driver 38 lights the visible semiconductor laser 28 in response to the ON signal and lights out the visible semiconductor laser 28 in response to the OFF signal.

Next, the circuit arrangement of the print data generating device 2 will be described while referring to FIG. 2. As shown in FIG. 2, the controller 51 of the print data generating device 2 includes CPU 61, RAM 62, ROM 63, timer 65 for measuring a time duration, and hard disk drive (hereinafter referred to as "HDD") 66. The CPU 61 functions as arithmetic/control device and governs overall operations of the print data generating device 2. The CPU 61, RAM 62, ROM 63 and timer 65 are mutually connected one another with buses (not shown), data inputted from and data output to one of these from another can be implemented. The CPU 61 and laser controller 66 are connected via an I/O interface (not shown) and are capable of inputting data one from the other and outputting data from one to the other.

The RAM 62 temporarily stores the computed results computed by the CPU 61. The ROM 63 stores various programs including programs illustrated in the form of flowcharts in FIGS. 3 to 9. The programs of FIGS. 3 to 9 may not necessarily be stored in the ROM 63 but may be stored in the HDD 66 or other storage, such as CD-ROM 57. Alternatively, the programs may be downloaded from a network, such as Internet. The laser controller 66 has storage areas for storing various kinds of application softwares and data files created by such application software.

Figure 13:
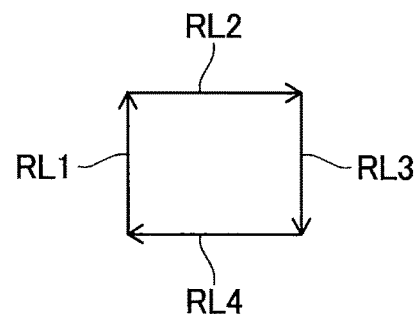
FIG. 13 is an explanatory diagram (rectangle shape) subject to a marking (print) process with laser beam LA scanned by a Galvano-scanner 18.
Figure 14:
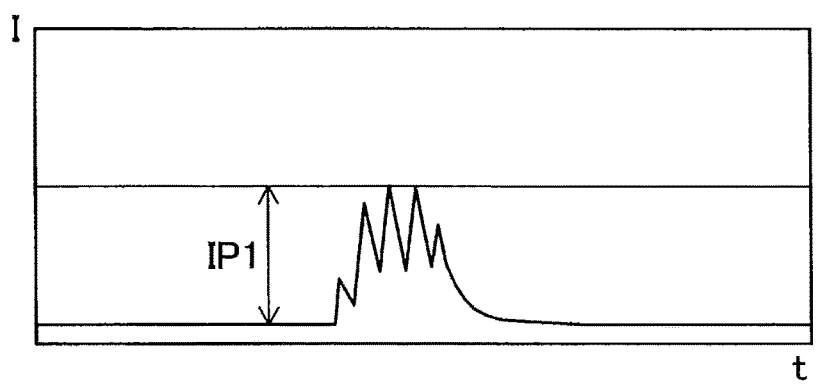
FIG. 14 shows a waveform of transient current flowing in a Galvano-scanner 18.

Briefly, the embodiment to be described hereinafter suppresses the peak value of transient current which may flow in the Galvano-scanner 18 at the time when the laser scanning or laser marking is carried out by scanning the laser beam LA with the Galvano-scanner 18 of the laser processing system 1. Conventionally, when a rectangle made up of four straight line segments RL1, RL2, RL3 and RL4 as shown in FIG. 13 is subject to laser scan processing, a transient current having a peak level IP1 flows in the Galvano-scanner 18 as shown in FIG. 14. Arrows indicated in FIG. 13 show the scanning direction of the laser beam LA.

Figure 15:
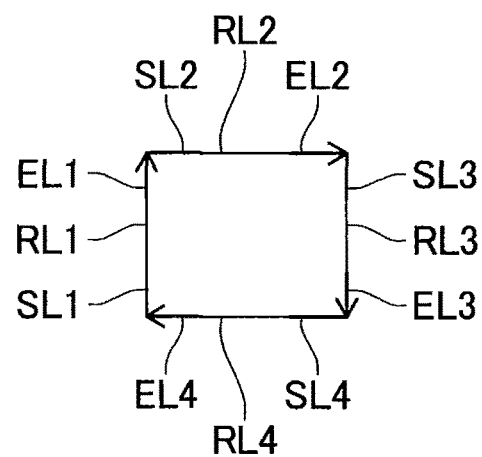
FIG. 15 is straight line segments set to the diagram shown in FIG. 13.

In accordance with the embodiment, sub-line segments are set on the print pattern, as shown in FIG. 13, for example. Specifically, as shown in FIG. 15, the straight line segment RL1 is divided into two parts or two sub-line segments SL1 and EL1 in which the former starts from the start point of the straight line segment RL1 and the latter starts from the end point of SL1 and ends at the end point of the straight line segment RL1. Likewise, the straight line segments RL2, RL3, and RL4 are respectively divided into two sub-line segments SL2 and EL2, SL3 and EL3, and SL4 and EL4, in which SL2, SL3, and SL4 start from the respective start points of the straight line segments RL2, RL3, and RL4, and EL2, EL3, and EL4 starts from the end points of the associated straight line segments and end at the end points of the respective straight line segments RL2, RL3, and RL4. Arrows indicated in FIG. 15 indicate the scanning direction of the laser beam LA.

Figure 16:
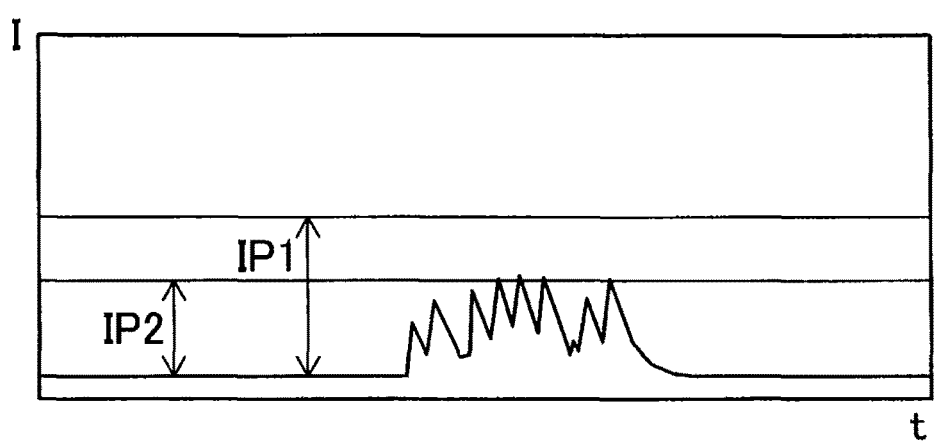
FIG. 16 is a waveform of transient current flowing in Galvano-scanner 18 according to the embodiment.

When a laser marking process is carried out with respect to the rectangle made up of four straight line segments RL1, RL2, RL3, and RL4, the scanning speeds for marking the sub-line segments SL1, SL2, SL3, SL4, and RL1, RL2, RL3, RL4 are slow down as compared with the scanning speed conventionally set. Slowing down the scanning speed results in lowering the peak level of the current flowing in the Galvano-scanner 18. As shown in FIG. 16, the current having a peak level IP2 flows in the Galvano-scanner 18 in accordance with the embodiment, which is lower than IP1 flowing in the Galvano-scanner 18 with the laser marking process conventionally carried out. In an example in which the length of each of the sub-lines SL1, SL2, SL3, SL4, EL1, EL2, EL3, and EL4 is set to 0.1 mm which length is 0.02 times as long as the length of the straight line segment RL1, RL2, RL3, and RL4, the peak level of current IP2 is lowered by 40% with respect to the peak level of current IP1.

<Coordinate Data Generating Process>

Next, referring to the flowcharts of FIGS. 3 to 9, description will be made with respect to the coordinate data generating process executed by the CPU 61 of the print data generating device 2.

Figure 3:
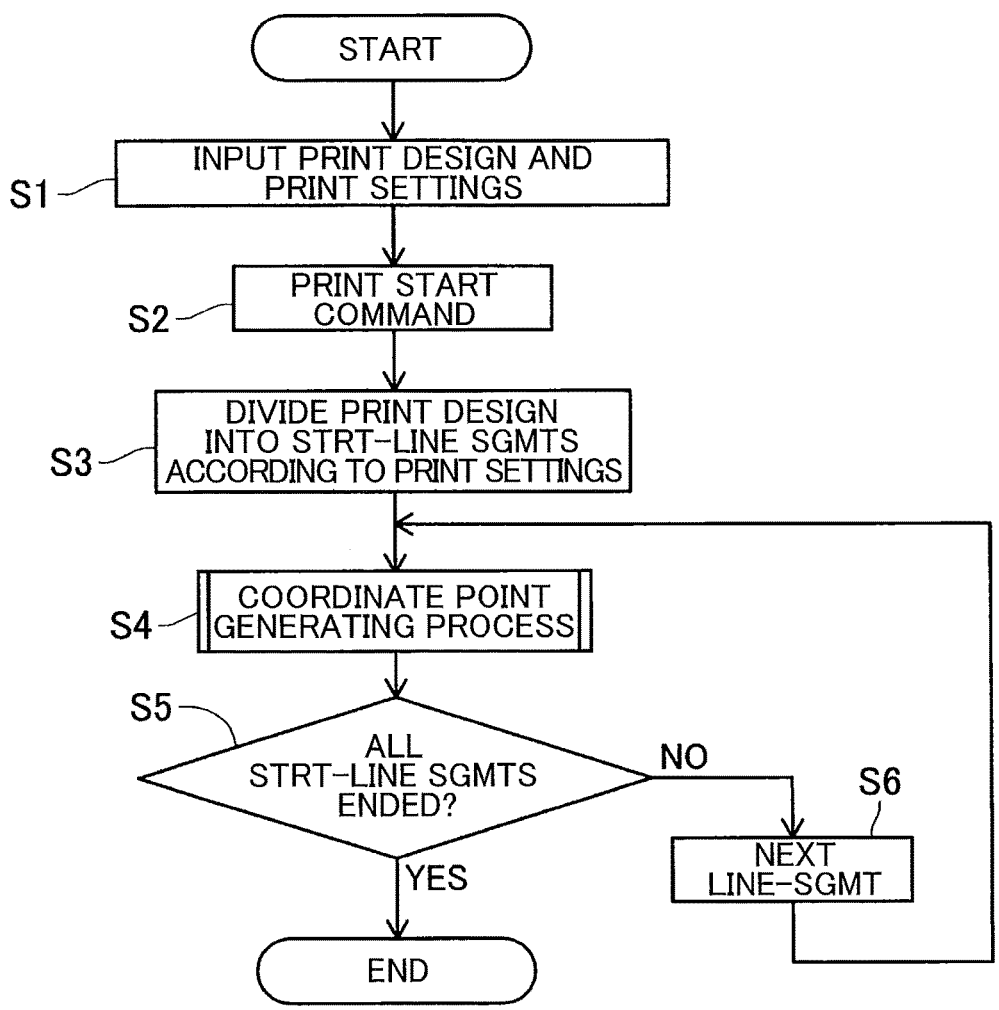
FIG. 3 is a flowchart illustrating a coordinate data generating process executed by CPU 61 of print data generating device 2.
Figure 4:
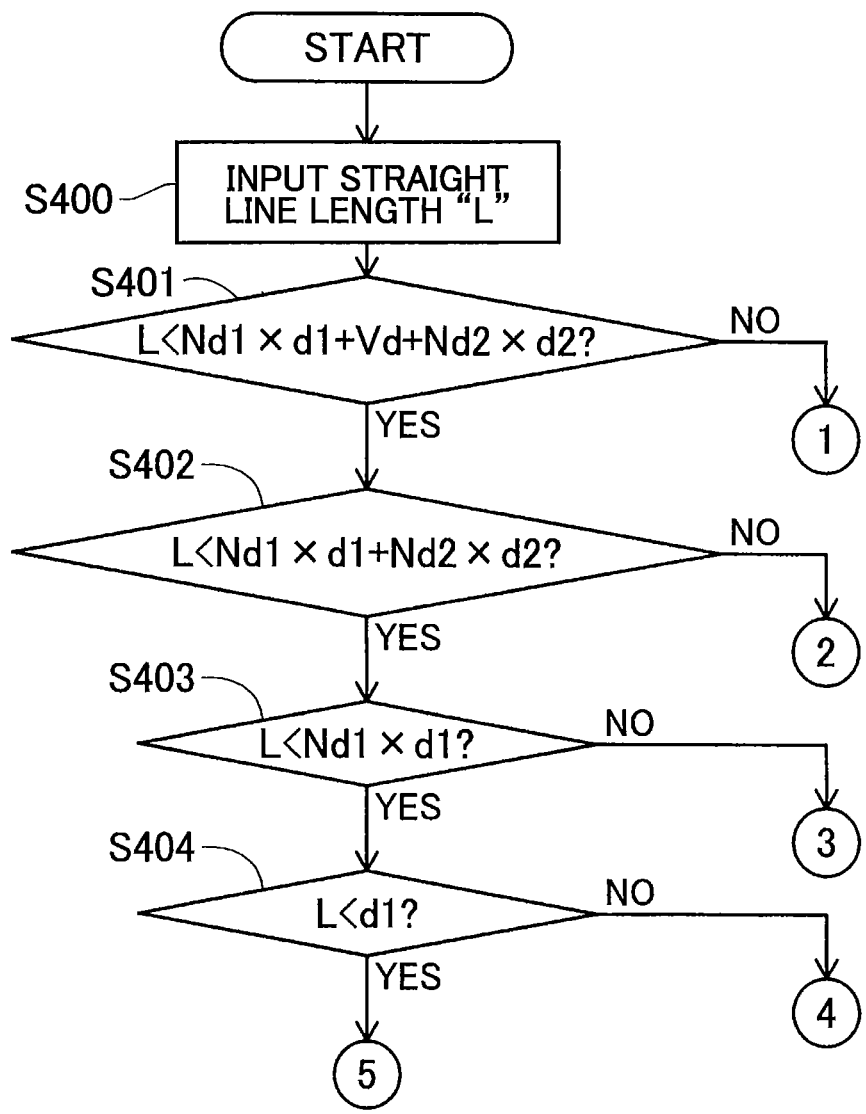
FIG. 4 is a flowchart illustrating a coordinate point generating process executed by CPU 61 of print data generating device 2.

As shown in FIG. 3, in step (hereinafter abbreviated to "S") 1, the CPU 61 executes input process of print design and print settings. The input process is carried out with the use of the input manipulation section 55 including the mouse 52 and the keyboard 53 to input a desired print design. The inputted print design is displayed on the LCD 56.

Figure 10:
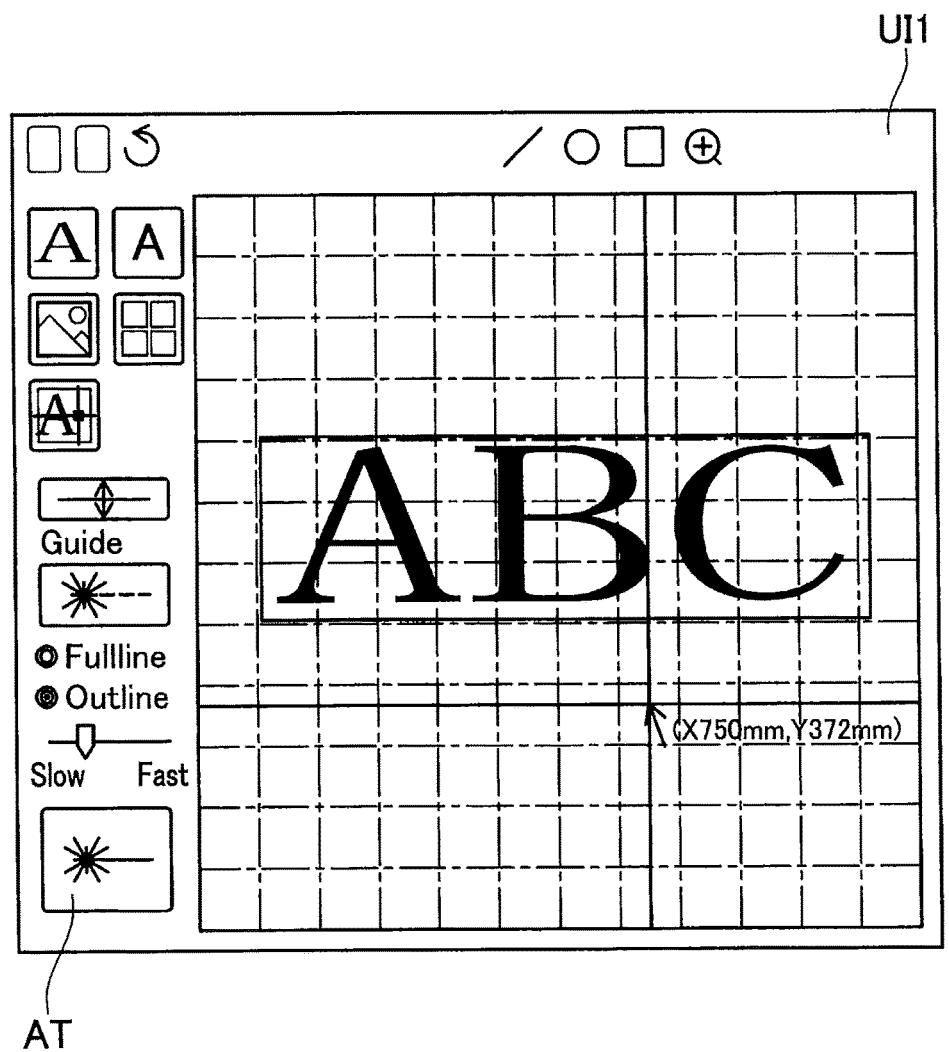
FIG. 10 shows an example of a user interface screen on LCD 56 displayed at the time of print design.

In the input process of the print design, a user interface screen UI1 is displayed on the LCD 56 as shown in FIG. 10. The user manipulates the mouse 52 and/or keyboard 53 to implement an input process of a print design on the user interface screen UI1. In the example shown in FIG. 10, a print design "ABC" appears in the user interface screen UI1. Clicking a print setting button AT displayed on the user interface screen UI1 by the mouse 52 ends the print design inputting process and starts a print settings process.

Figure 11:
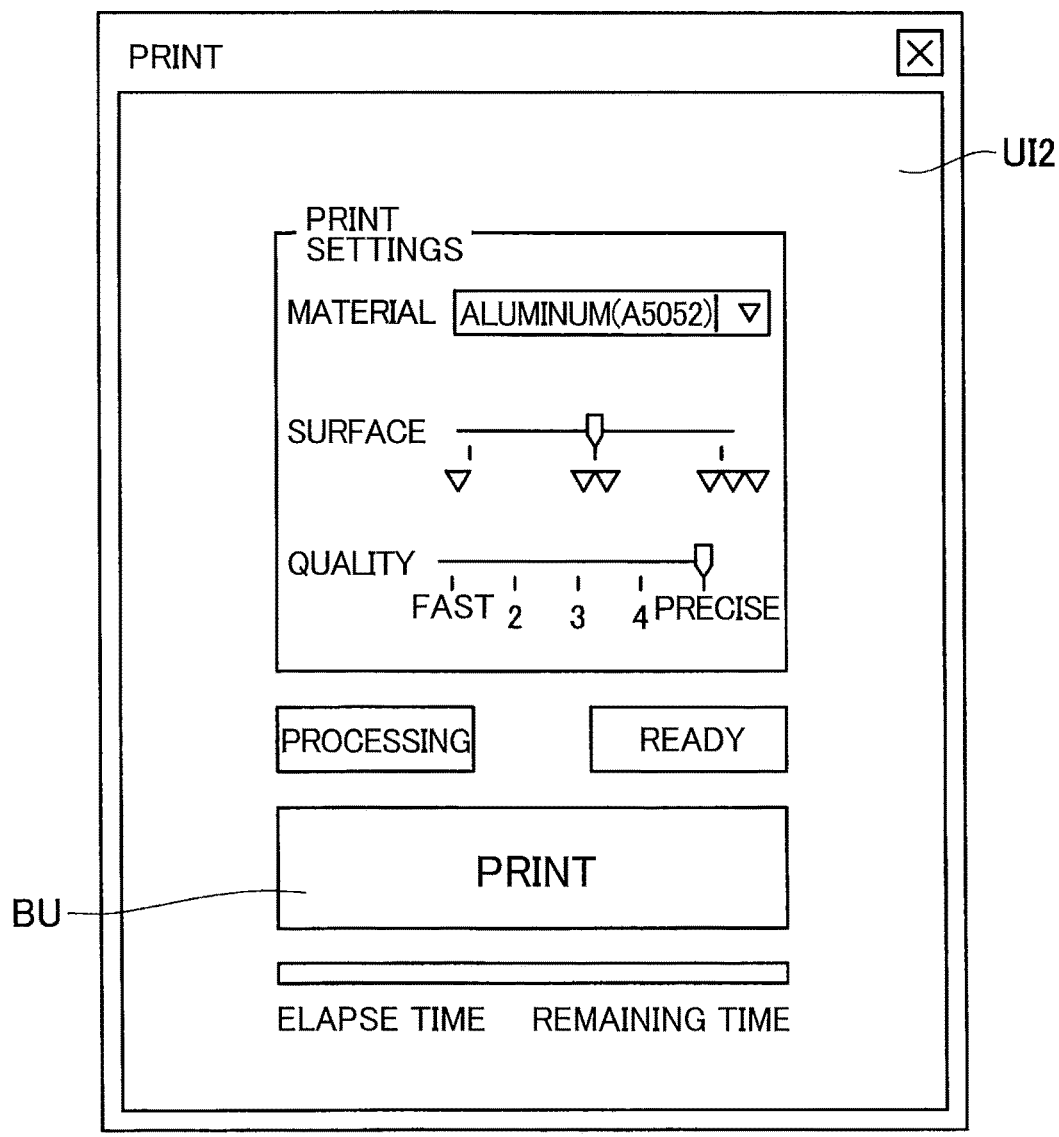
FIG. 11 shows an example of a user interface screen displayed on LCD 56 at the time of print settings.

In executing the print settings, the user interface screen UI2 as shown in FIG. 11 is displayed on the LCD 56. To execute the input settings, the user manipulates the mouse 52 and/or the keyboard 53. To increase the scanning speed of the Galvano-scanner 18, the user moves the indication arrow on the scale of "Quality" in the direction of "FAST". Conversely, moving the indication arrow in the direction of "PRECISE", the scanning speed of the Galvano-scanner 18 is decreased. In this manner, the scanning speed of the Galvano-scanner 18 is set.

Figure 12:
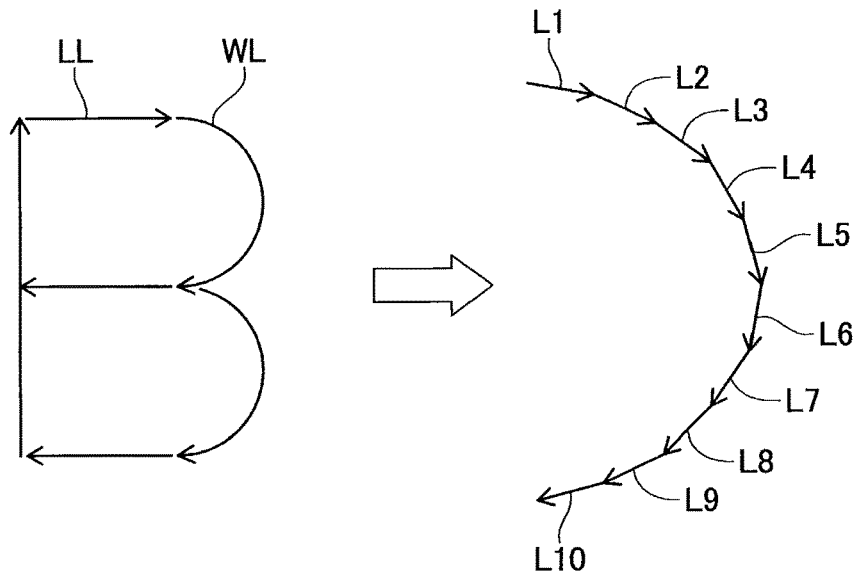
FIG. 12 is an explanatory diagram showing an example of dividing a given diagram into a plurality of straight line segments.

In S2, the CPU 61 executes a print start command process. This process starts with a click of a "PRINT" button BU displayed on the user interface screen UI2 by the mouse 52. In S3, the CPU 61 executes a process for dividing the print design into straight line segments according to the print settings. In this process, the straight line LL shown in FIG. 12 remains unprocessed and a curve line WL is divided, for example, into short straight line segments. As shown in FIG. 12, the curve line portion WL is divided into ten and the divided segments are treated as being straight line segments L1 to L10 while the straight line portion LL of the print design "B" is not divided. Because the lines making up of the actual print design have varying thickness as can be seen from FIG. 10, a filling process needs to be effected to portions where necessary. For example, the straight line segments L5 and L6 need to be thickened to a degree as set in the print settings.

One example of the filing process is carried out in such a manner that the laser beam LA is scanned horizontally within the designated range and such a horizontal scan is repeatedly carried out while shifting the laser beam LA in the vertical direction at an equi-pitch.

In S4, the CPU 61 executes a coordinate point generating process. Details of the coordinate point generating process are illustrated in the flowchart shown in FIG. 4. In S400, the CPU 61 executes an input process for inputting a length L of a straight line segment. The CPU 61 determines whether the length L of the i-th input is shorter than a first predetermined length equal to (Nd1×d1+Vd+Nd2×d2) where Nd1 represents number of sub-line segments each between two adjacent points at a firsts part close to the start point; Nd2, number of sub-line segments each between two adjacent points at a second part close to the end point; d1, a first point-to-point distance in the first part; d2, a second point-to-point distance in the second part; and Vd, a length of a third part between the first part and the second part.

When the length L inputted in S400 is equal to or longer than the first predetermined length (S401: NO), the routine proceeds to S11 shown in the flowchart of FIG. 5 (to be described later). On the other hand, when the length L inputted in S400 is shorter than the first predetermined length (S401: YES), the routine proceeds to S402.

In one example, coordinate generating period T is set to 1 msec; the length L of the straight line segment to 5 mm; the first point-to-point distance d1 to 0.1 mm; and the second point-to-point distance d2 to 0.1 mm. Δd to be described later is set to, for example, 0.05 mm. The length Vd where the laser beam LA moves at the coordinate point generating period T is, for example, 1 mm. Therefore, the scanning speed V is calculated by dividing Vd by T (Vd/T). In the above example, the scanning speed V is: d1/T=0.1 mm/1 msec=0.1 m/sec. The second speed V2 is given by d2/T=0.1 m/sec.

In S402, the CPU 61 determines whether the length L is shorter than a second predetermined length equal to (Nd1×d1+Nd2×d2). When the length L inputted in S400 is equal to or longer than the second predetermined length (S402: NO), the routine proceeds to S21 shown in the flowchart of FIG. 6 (to be described later). On the other hand, when the length L inputted in S400 is shorter than the second predetermined length (S402: YES), the routine proceeds to S403.

In S403, the CPU 61 determines whether the length L is shorter than a third predetermined length equal to (Nd1×d1). When the length L inputted in S400 is equal to or longer than the third predetermined length (S403: NO), the routine proceeds to S31 shown in the flowchart of FIG. 7 (to be described later). On the other hand, when the length L inputted in S400 is shorter than the third predetermined length (S403: YES), the routine proceeds to S404.

In S404, the CPU 61 determines whether the length L is shorter than a fourth predetermined length equal to the first point-to-point distance d1. When the length L inputted in S400 is equal to or longer than the fourth predetermined length (S404: NO), the routine proceeds to S41 shown in the flowchart of FIG. 8 (to be described later). On the other hand, when the length L inputted in S400 is shorter than the fourth predetermined length (S404: YES), the routine proceeds to S51 shown in the flowchart of FIG. 9.

Figure 5:
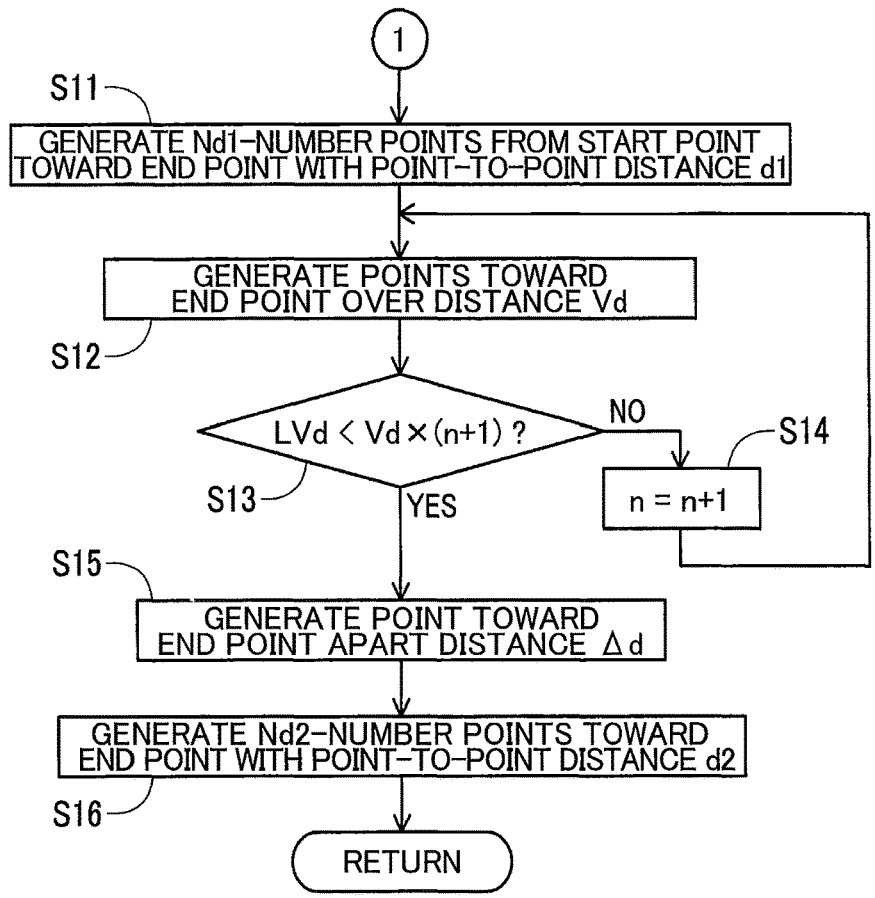
FIG. 5 is a flowchart branched from the flowchart of FIG. 4, in which illustrated is a coordinate point generating process executed by CPU 61 of print data generating device 2.
Figure 17A:
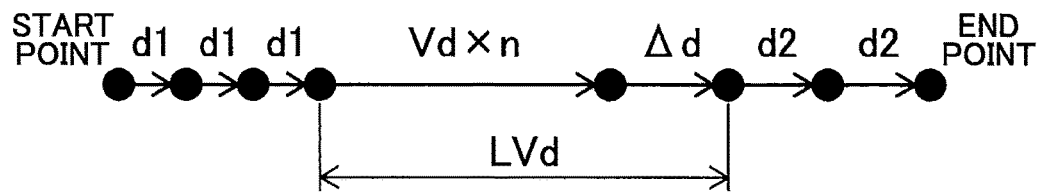
FIG. 17A is an explanatory diagram showing one example of division of a straight line segment.

When the routine proceeds to S11 shown in the flowchart of FIG. 5, coordinate points are generated as shown, for example, in FIG. 17A. The coordinate points thus generated are stored in RAM 62 of the print data generating device 2. In S11, the CPU 61 generates Nd1-number coordinate points which are consecutively arranged starting from the start point toward the end point of the straight line segment with the first point-to-point distance d1. In the example shown in FIG. 17A, Nd1 is three (3).

In S12, the CPU 61 generates coordinate points immediately after the end of the point generated in S11 toward the end point of the straight line segment over the distance Vd. In S13, the CPU 61 determines whether the distance LVd is shorter than a distance Vd×(n+1). As shown in FIG. 17A, the distance LVd is a distance of an intermediate part of the straight line segment between the coordinate point at the end of a first group containing coordinate points consecutively arranged at the first point-to-point distance d1 and coordinate point at the start of a second group containing coordinate points consecutively arranged at the second point-to-point distance d2. The parameter "n" is a variable and is set to one (1) as a default value.

When the distance LVd is equal to or longer than Vd×(n+1) (S13: NO), the routine proceeds to S14. In S14, the variable "n" is incremented, and then the routine returns to S12 in which the distance in the intermediate part of the straight line segment is extended by Vd toward the end point. On the other hand, when the distance LVd is shorter than Vd×(n+1) (S13: YES), the routine proceeds to S15 where the CPU 61 generates a coordinate point at a position apart by Δd from the coordinate point generated lastly in S13. Δd is calculated by an equation:

$$\Delta d = LVd - Vd \times n.$$

That is, the CPU 61 generates a coordinate points arranged from the end point of the straight line segment toward the start point thereof over a distance d2×Nd from the end point of the straight line toward the start point. In the case of FIG. 17A, Nd2 is two (2). A distance between the coordinate point generated in the case of "ES" in S13 and the coordinate point generated in S15 is Δd.

In S16, coordinate points in the second part of the straight line are generated. The CPU 61 generates coordinate points over a distance Nd2-number of times as long as the second point-to-point distance d2 toward the end point of the straight line immediately after the coordinate point generated in S15. The coordinate point at a position Nd2-number of times as long as the second point-to-point distance d2 is in coincidence with the end point of the straight line. The coordinate data of the thus generated coordinate points are stored in the RAM 62. Thereafter, the routine proceeds to S5 of the flowchart shown in FIG. 5.

Figure 6:
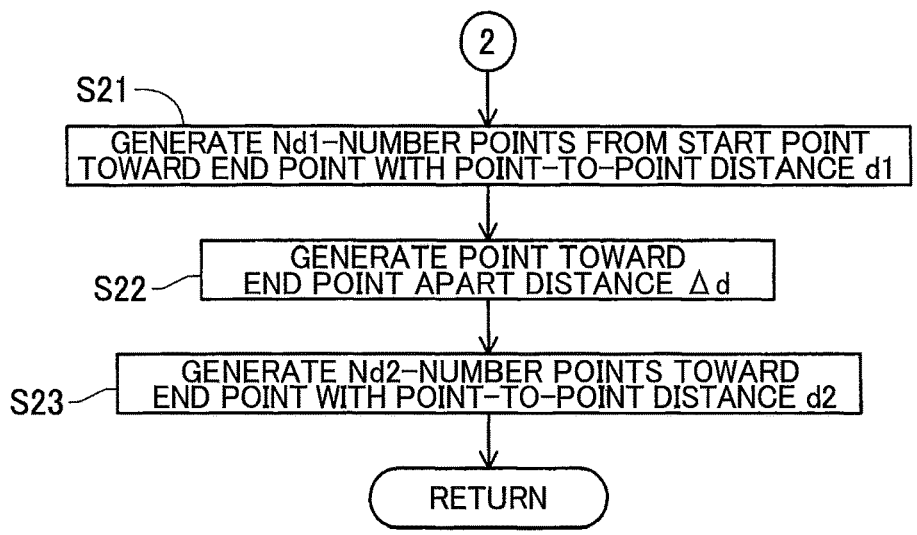
FIG. 6 is a flowchart branched from the flowchart of FIG. 4, in which illustrated is a coordinate point generating process executed by CPU 61 of print data generating device 2.
Figure 17B:
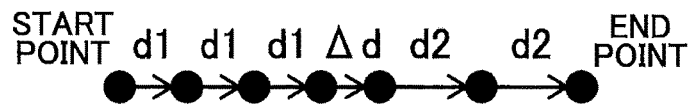
FIG. 17B is an explanatory diagram showing one example of division of a straight line segment having a length shorter than that shown in FIG. 17A.

When the routine proceeds to S21 in the flowchart of FIG. 6, the coordinate points are generated as in the case of FIG. 17B and stored in the RAM 62 in due course. In S21, the CPU 61 generates coordinate points over a distance Nd1-number of times as long as the first point-to-point distance d1 from the start point of the straight line toward the end point. In the case of FIG. 17B, Nd is three (3). The coordinate data thus generated is stored in the RAM 62.

In S22, the CPU 61 generates a coordinate point at a position apart by $\Delta d$ from the coordinate point generated in S21 toward the end point of the straight line. That is, the CPU 61 generates a coordinate point at a position apart by a distance d2×Nd2 from the end point of the straight line toward the start point thereof. In the case of FIG. 17B, Nd2 is two (2). A distance between the Nd1-th coordinate point generated in S21 and the coordinate point generated in S22 is $\Delta d$.

In S23, the CPU 61 generates coordinate points over a distance Nd2-number of times as long as the second point-to-point distance d2 toward the end point of the straight line immediately after the coordinate point generated in S22. The coordinate point at a position Nd2-number of times as long as the second point-to-point distance d2 is in coincidence with the end point of the straight line. In the case of FIG. 17B, Nd2 is two (2). The coordinate data thus generated is stored in RAM 62. Thereafter, the routine proceeds to S3 in the flowchart of FIG. 3.

Figure 7:
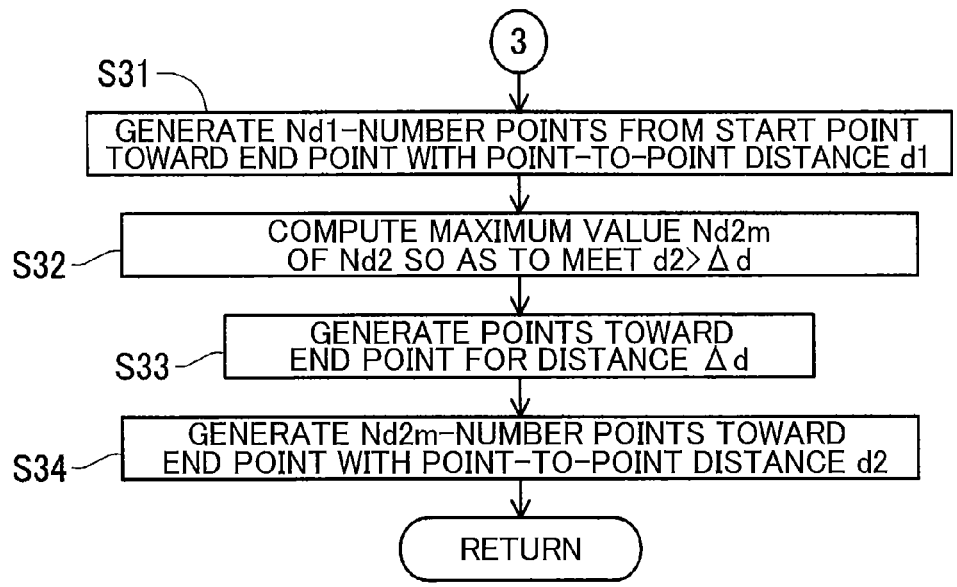
FIG. 7 is a flowchart branched from the flowchart of FIG. 4, in which illustrated is a coordinate point generating process executed by CPU 61 of print data generating device 2.
Figure 17C:
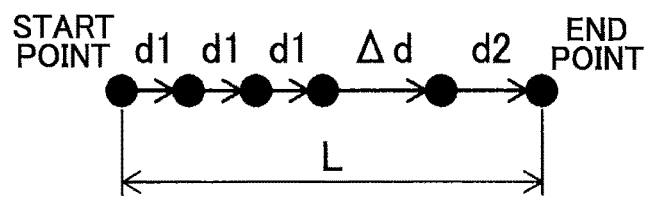
FIG. 17C is an explanatory diagram showing one example of division of a straight line segment having a length shorter than that shown in FIG. 17B.

When the routine proceeds to S31 in the flowchart of FIG. 7, the coordinate points are generated as in the case of FIG. 17C and stored in the RAM 62 in due course. In S31, the CPU 61 generates coordinate points over a distance Nd1-number of times as long as the first point-to-point distance d1 from the start point of the straight line segment toward the end point thereof. In the case of FIG. 17C, Nd is three (3). The coordinate data thus generated is stored in the RAM 62.

In S32, the CPU 61 obtains the maximum value Nd2m of the number of times Nd2 so as to meet d2>$\Delta d$. In the case of FIG. 17C, Nd2 is one (1). More specifically, the maximum value Nd2m of Nd2 can be computed by an equation:

$$Nd2m=(L-Nd1\times Nd1)/d2.$$

In S33, the coordinate point is generated at a position apart by $\Delta d$ from the Nd1-number coordinate position toward the end point of the straight line. That is, the CPU 61 generates a coordinate point at a position apart by a distance d2×Nd2m from the end point of the straight line toward the start point. In the case of FIG. 17C, Nd2m is one (1). A distance between the coordinate point generated in the Nd1-th number in S31 and the coordinate point generated in S33 is $\Delta d$.

In S34, the CPU 61 generates coordinate points over a distance Nd2m-number of times as long as the second point-to-point distance d2 from the start point of the straight line toward the end point thereof. The coordinate position at the Nd2m-th number is in coincidence with the end point of the straight line segment. In the case of FIG. 17C, Nd2m is one (1). The coordinate data thus generated is stored in the RAM 62 in due course and thereafter the routine proceeds to S5.

Figure 8:
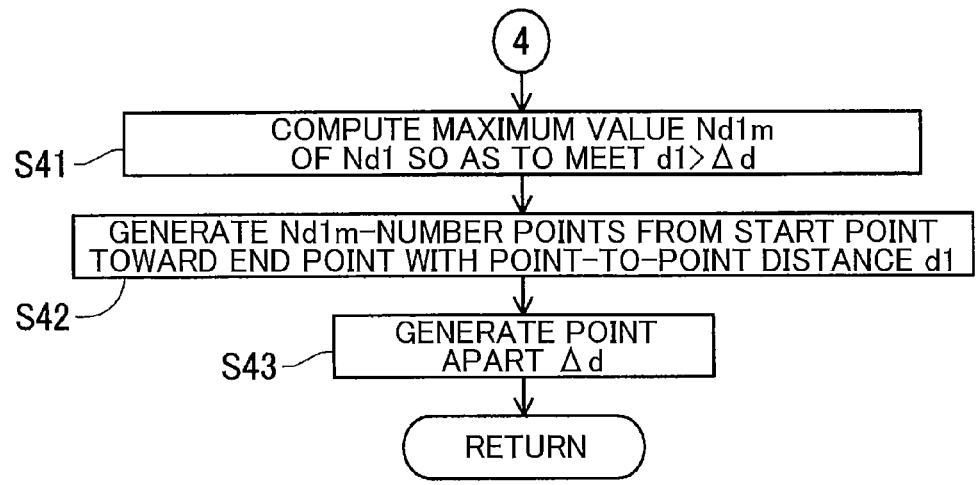
FIG. 8 is a flowchart branched from the flowchart of FIG. 4, in which illustrated is a coordinate point generating process executed by CPU 61 of print data generating device 2.
Figure 17D:
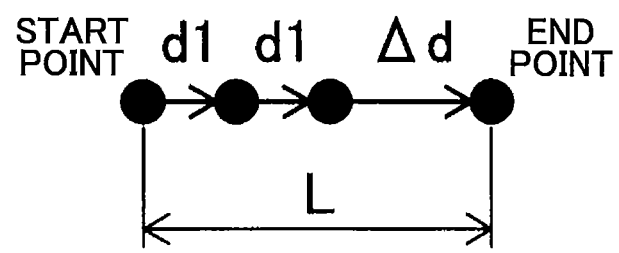
FIG. 17D is an explanatory diagram showing one example of division of a straight line segment having a length shorter than that shown in FIG. 17C.

When the routine proceeds to S41 in the flowchart of FIG. 8, the coordinate positions are generated, for example, as in the case of FIG. 17D and the resultant data is stored in the RAM 62.

In S41, the CPU 61 obtains the maximum value Ndm1 of the number of times Nd1 so as to meet d1>$\Delta d$. In the case of FIG. 17D, Nd1m is two (2). More specifically, the maximum value Nd1m of Nd1 can be computed by an equation: Nd1m=L/d1.

In S42, the CPU 61 generates coordinate points Nd1m-number of times with the first point-to-point distance d1 from the start point of the straight line segment toward the end point thereof. In the case of FIG. 17D, Nd1m is two (2). The coordinate data representing the generated coordinate points are stored in the RAM 62.

In S43, the CPU 61 generates a coordinate point apart by $\Delta d$ from the Nd1m-th number coordinate point as the end point. The CPU 61 computes with an equation: $\Delta d$=L−Nd1m×d1. That is, the distance between the Nd1m-th number coordinate position determined in S42 and the coordinate position at the end point is $\Delta d$. Thereafter, the routine proceeds to S5 of the flowchart shown in FIG. 3.

Figure 9:
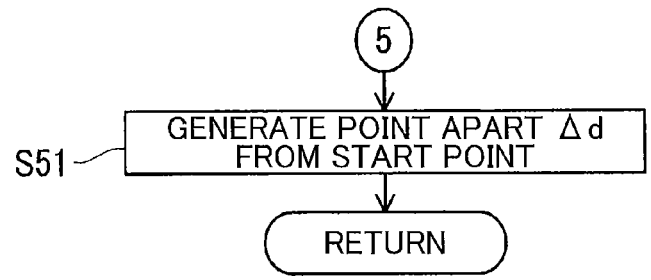
FIG. 9 is a flowchart branched from the flowchart of FIG. 4, in which illustrated is a coordinate point generating process executed by CPU 61 of print data generating device 2.
Figure 17E:
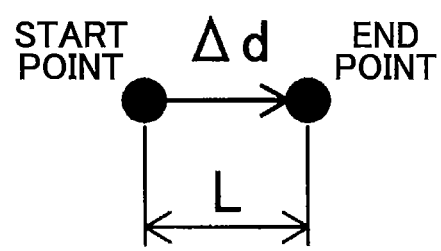
FIG. 17E is an explanatory diagram showing one example of division of a straight line segment having a length shorter than that shown in FIG. 17D.

When the routine proceeds to S51 shown in the flowchart of FIG. 9, the coordinate points are generated as in the case of FIG. 17E and the coordinate data for the coordinate points thus generated is stored.

In S51, the CPU 61 generates a coordinate point as the end point where is apart by $\Delta d$ from the start point. The CPU 61 is capable of determining the end point according to the relation $\Delta d$=L. That is, the distance from the start point to the end point is $\Delta d$. Thereafter, the routine proceeds to S5 shown in the flowchart of FIG. 3.

The scanning speed of the Galvano-scanner 18 is set differently to each of the sub-line segments defined by the coordinate points generated in the flowcharts of FIGS. 5 to 9, i.e., (1) the sub-line segment having a length corresponding to at least one first point-to-point distance d1; (2) the sub-line segment having a length of Vd×n; (3) the sub-line segment having a length of $\Delta d$; and (4) the sub-line segment having a length corresponding to at least one second point-to-point distance d2. The scanning speed of the Galvano-scanner 18 for the line segment (2) is set to a designated scanning speed designated in the print settings executed in S1. The designated speed is given by dividing Vd with a unit time period. The unit time period is equal to a period or cycle for generating the coordinate points. The coordinate point generating period is, for example, set to 1 msec.

The scanning speed of the Galvano-scanner 18 for the line length defined by the first point-to-point distance d1 is set to be lower than the designated scanning speed designated through the user interface screen UI2 shown in FIG. 11. The scanning speed of the Galvano-scanner 18 for the line length defined by the second point-to-point distance d2 is also set to be lower than the designated scanning speed. The scanning speed of the Galvano-scanner 18 for the line length defined by $\Delta d$ is set to be lower than the designated scanning speed but higher than the scanning speeds for the lengths defined by both the first and second point-to-point distance d2.

Referring back to the flowchart shown in FIG. 3, the CPU 61 determines whether processes for all the straight lines are finished. In this process, the processes executed in the sub-routine of S4 are finished with respect to each of all the straight line segments making up of the print design. More specifically, determination is made as to whether or not the variable "i" is equal to or smaller than the number Lm. The variable "i" indicates the number of straight lines to which the coordinate point generating process has been executed. The number Lm indicates the number of straight line segments making up of the print design. Lm is, for example, four (4).

When the processes in the sub-routine of S4 has not yet ended with respect to each of all the straight line segments making up of the print design inputted in S1 (S5: NO), the routine proceeds to S6 where the CPU 61 executes the process for the following straight line segment. That is, the variable "i" is incremented. After execution of the process of S6, the routine returns to S4 and the CPU 61 repeatedly executes the sub-routine process of S4. When the processes in the sub-routine of S4 has been ended for all the straight line segments of the print design (S5: YES), the CPU 61 finishes the coordinate point generating process.

In the above-described embodiment, the skeleton depicted in FIG. 12 shows the outermost profile line of the print design "B". As shown in FIG. 10, the print design "B" is made up of a thick vertical straight line and a thickness-varying curve line. For the thick line portions, scanning is repeatedly performed in the thickness direction at an equi-pitch.

Although the present invention has been described with respect to specific embodiments, it will be appreciated by one skilled in the art that a variety of changes may be made without departing from the scope of the invention. For example, the coordinate point generating process illustrated by the flowcharts shown in FIGS. 3 to 9 can be executed by the CPU 41 of the laser controller 6 in lieu of the CPU 61 of the print data generating device 2.

What is claimed is:

1. A non-transitory computer readable storage medium storing a set of program instructions for an arithmetic unit to generate a plurality of pieces of coordinate data including coordinate data representing a start point and an end point of a straight line segment, the coordinate data generated by the arithmetic unit being used for processing a workpiece to form a predetermined print design thereon with a laser beam scanned by a scanning section of a laser processing system, the set of program instructions comprising:

an acquiring process for acquiring a designated scanning speed of the scanning section;

a dividing process for dividing the print design into one or more straight line segments;

a determining process for determining whether a straight line segment selected from the one or more straight line segments has a length shorter than a predetermined length;

a first coordinate data generating process for generating first coordinate data in response to determination made in the determining process that the selected straight line segment has a length not shorter than a predetermined length, coordinate points represented by the first coordinate data belonging to at least one of a first group and a second group, wherein;

(a1) one or more coordinate points belonging to the first group are arranged consecutively at an equi-pitch on the selected straight line segment from a start coordinate point of the selected straight line segment toward an end coordinate point thereof;

(a2) each of the one or more coordinate points belonging to the first group designates an end point of a sub-line segment defined by two adjacent coordinate points and is within the selected straight line segment;

(a3) a scanning speed for the coordinate points represented by the first coordinate data and belonging to the first group is set to a first speed lower than the designated scanning speed;

(b1) the one or more coordinate points belonging to the second group are arranged consecutively at an equi-pitch on the selected straight line segment from the end coordinate point of the selected straight line segment toward the start coordinate point thereof;

(b2) each of the one or more coordinate points belonging to the second group designates an end point of a sub-line segment defined by two adjacent coordinate points and is within the selected straight line segment; and (b3) a scanning speed for the coordinate points represented by the first coordinate data and belonging to the second group is set to a second speed lower than the designated scanning speed; and a second coordinate data generating process for generating second coordinate data different from the first coordinate data in response to determination made in the determining process that the selected straight line segment has a length not shorter than the predetermined length, wherein:

(c1) the second coordinate data is generated following generation of the first coordinate data, and represents one or more coordinate points set to a vacant portion of the selected straight line segment where no coordinate points represented by the first coordinate data are set;

(c2) each of the one or more coordinate points designates an end point of a sub-line segment defined by two adjacent coordinate points of the one or more coordinate points represented by the second coordinate data and is within the selected straight line segment; and (c3) the one or more coordinate points represented by the second coordinate data are scanned at the designated scanning speed.

2. The non-transitory computer readable storage medium according to claim 1, wherein the coordinate points represented by the first coordinate data belong to either one of the first group and the second group; one or more coordinate points belonging to the first group are arranged consecutively at an equi-pitch on the selected straight line segment from the start coordinate point of the selected straight line segment toward the end coordinate point thereof and one or more coordinate points belonging to the second group are arranged consecutively at an equi-pitch on the selected straight line segment from the end coordinate point of the selected straight line segment toward the start coordinate point thereof; and a scanning speed for the coordinate points represented by the first coordinate data belonging to the first group is set to the first speed lower than the designated scanning speed and a scanning speed for the coordinate points represented by the first coordinate data belonging to the second group is set to the second speed lower than the designated scanning speed.

3. The non-transitory computer readable storage medium according to claim 2, wherein a plurality of coordinate points belongs to the first group and a plurality of coordinate points belongs to the second group.

4. The non-transitory computer readable storage medium according to claim 3, wherein the length of the predetermined length is longer than a sum of a first length, a second length, and a third length, wherein the first length is a length of the sub-line segment defined by two adjacent coordinate points of the one or more coordinate points represented by the second coordinate data, the second length is a length of the first portion of the selected straight line segment where the plurality of coordinate points belonging to the first group is consecutively arranged, and the third length is a length of the second portion of the selected straight line segment where the plurality of coordinate points belonging to the second group is consecutively arranged.

5. The non-transitory computer readable storage medium according to claim 4, wherein each of the second length and the third length is shorter than the first length.

6. The non-transitory computer readable storage medium according to claim 1, wherein the set of program instructions further comprises a third coordinate data generating process for generating third coordinate data in response to determination made in the determining process that the length of the selected straight line segment is shorter than the predetermined length, at least a part of the coordinate points represented by the third coordinate data belonging to at least one of a third group and a fourth group, wherein:
- (d1) one or more coordinate points belonging to the third group are arranged consecutively at an equi-pitch on the selected straight line segment from a start coordinate point of the selected straight line segment toward an end coordinate point thereof;
- (d2) each of the one or more coordinate points belonging to the third group designates an end point of a sub-line segment defined by two adjacent coordinate points and is within the selected straight line segment;
- (d3) a scanning speed for the coordinate points represented by the third coordinate data and belonging to the third group is set to a third speed lower than the designated scanning speed;
- (e1) the one or more coordinate points belonging to the fourth group are arranged consecutively at an equi-pitch on the selected straight line segment from the end coordinate point of the selected straight line segment toward the start coordinate point thereof;
- (e2) each of the one or more coordinate points belonging to the fourth group designates an end point of a sub-line segment defined by two adjacent coordinate points and is within the selected straight line segment; and
- (e3) a scanning speed for the coordinate points represented by the third coordinate data and belonging to the fourth group is set to a fourth speed lower than the designated scanning speed.

7. A laser processing system comprising:
- a laser oscillator configured to emit a laser beam;
- a Galvano-scanner configured to scan the laser beam; and
- a controller configure to control the Galvano-scanner to perform scanning operations of the laser beam based on coordinate data representing coordinate points onto which the laser beam is irradiated, thereby forming a print pattern on a workpiece, the controller being further configured to generate the coordinate data using a set of program instructions comprising:
- an acquiring process for acquiring a designated scanning speed of the scanning section;
- a dividing process for dividing the print design into one or more straight line segments;
- a determining process for determining whether a straight line segment selected from the one or more straight line segments has a length shorter than a predetermined length;
- a first coordinate data generating process for generating first coordinate data in response to determination made in the determining process that the selected straight line segment has a length not shorter than a predetermined length, the coordinate points represented by the first coordinate data belonging to at least one of a first group and a second group, wherein:
- (a1) one or more coordinate points belonging to the first group are arranged consecutively at an equi-pitch on the selected straight line segment from a start coordinate point of the selected straight line segment toward an end coordinate point thereof;
- (a2) each of the one or more coordinate points belonging to the first group designates an end point of a sub-line segment defined by two adjacent coordinate points and is within the selected straight line segment;
- (a3) a scanning speed for the coordinate points represented by the first coordinate data and belonging to the first group is set to a first speed lower than the designated scanning speed;
- (b1) the one or more coordinate points belonging to the second group are arranged consecutively at an equi-pitch on the selected straight line segment from the end coordinate point of the selected straight line segment toward the start coordinate point thereof;
- (b2) each of the one or more coordinate points belonging to the second group designates an end point of a sub-line segment defined by two adjacent coordinate points and is within the selected straight line segment; and
- (b3) a scanning speed for the coordinate points represented by the first coordinate data and belonging to the second group is set to a second speed lower than the designated scanning speed; and
- a second coordinate data generating process for generating second coordinate data different from the first coordinate data in response to determination made in the determining process that the selected straight line segment has a length not shorter than the predetermined length, wherein:
- (c1) the second coordinate data is generated following generation of the first coordinate data, and represents one or more coordinate points set to a vacant portion of the selected straight line segment where no coordinate points represented by the first coordinate data are set;
- (c2) each of the one or more coordinate points designates an end point of a sub-line segment defined by two adjacent coordinate points of the one or more coordinate points represented by the second coordinate data and is within the selected straight line segment; and
- (c3) the one or more coordinate points represented by the second coordinate data are scanned at the designated scanning speed.

* * * * *